United States Patent [19]
Pincott

[11] Patent Number: 5,301,406
[45] Date of Patent: Apr. 12, 1994

[54] TIRE RASP BLADE

[75] Inventor: James S. Pincott, Auburn, Australia

[73] Assignee: Spencer Industries Pty. Ltd., Auburn, Australia

[21] Appl. No.: 943,385

[22] Filed: Sep. 10, 1992

Related U.S. Application Data

[63] Continuation of Ser. No. 682,563, Apr. 9, 1991, abandoned.

[51] Int. Cl.⁵ .............................................. B23D 71/00
[52] U.S. Cl. .............................................. 29/79; 29/78
[58] Field of Search ...................................... 29/78, 79

[56] References Cited

U.S. PATENT DOCUMENTS

| | | | |
|---|---|---|---|
| 2,896,309 | 7/1959 | Jensen | 29/79 |
| 3,082,506 | 3/1963 | Jensen | 29/79 |
| 3,102,325 | 9/1963 | Hemmeter | 29/79 |
| 3,528,153 | 9/1970 | Walter | 29/79 |
| 3,680,185 | 8/1972 | Wood | 29/79 |
| 3,879,825 | 4/1975 | Jensen et al. | 29/79 |
| 4,021,899 | 5/1977 | Jensen | 29/79 |
| 4,091,516 | 5/1978 | Jensen et al. | 29/78 |
| 4,287,648 | 9/1981 | Hineborg et al. | 29/79 |
| 4,336,640 | 6/1982 | Willinger | 29/79 |
| 4,747,194 | 5/1988 | Wood et al. | 29/78 |
| 5,054,177 | 10/1991 | Jensen | 29/78 |

Primary Examiner—William E. Terrell
Attorney, Agent, or Firm—Pravel Hewitt Kimball & Krieger

[57] ABSTRACT

A tire rasp blade made with an arcuate shape and a plurality of sets of teeth at the outer working edge having recesses between each set of teeth. Each set of teeth is inclined in the same direction and is formed by two teeth, with the pair of teeth in each set separated by an inclined narrow slit which has a curved portion at its inner end and which extends inwardly beyond the depth of the recesses between the teeth. Each pair of teeth in each set is displaced laterally or angularly from each other and from the body of the rasp blade. Each tooth of each pair includes a leading edge and a trailing edge wherein the portion of the teeth edges near the outer edge of the blade body are substantially straight or curved.

In another embodiment of the invention, clearing teeth are provided wherein each clearing tooth replaces a set of teeth at intervals of the teeth sets along the rasp blade of the rasp blades described above. Each clearing tooth is formed by a single tooth which is in the same plane as the blade body and which does not include the inclined narrow slit of the other teeth sets.

21 Claims, 3 Drawing Sheets

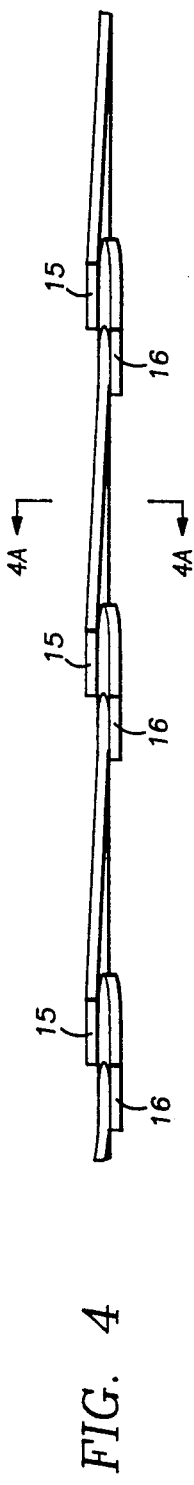
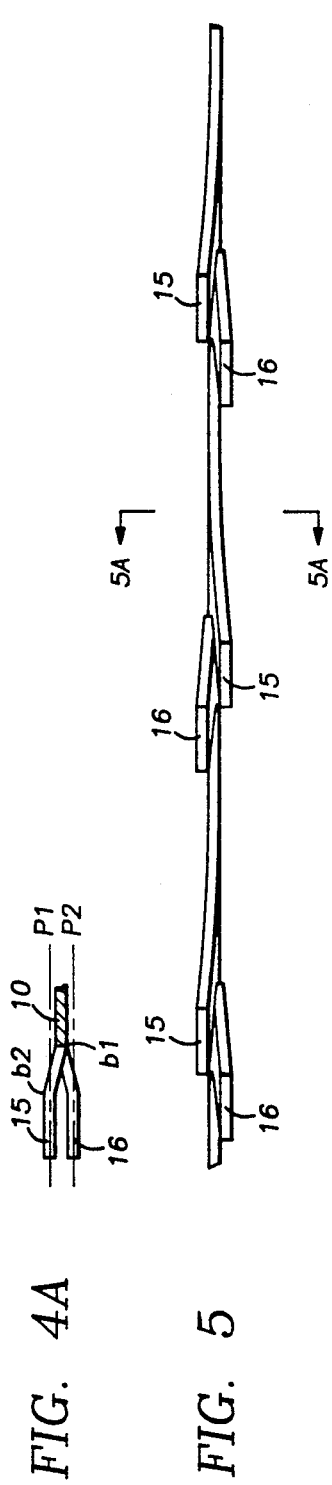
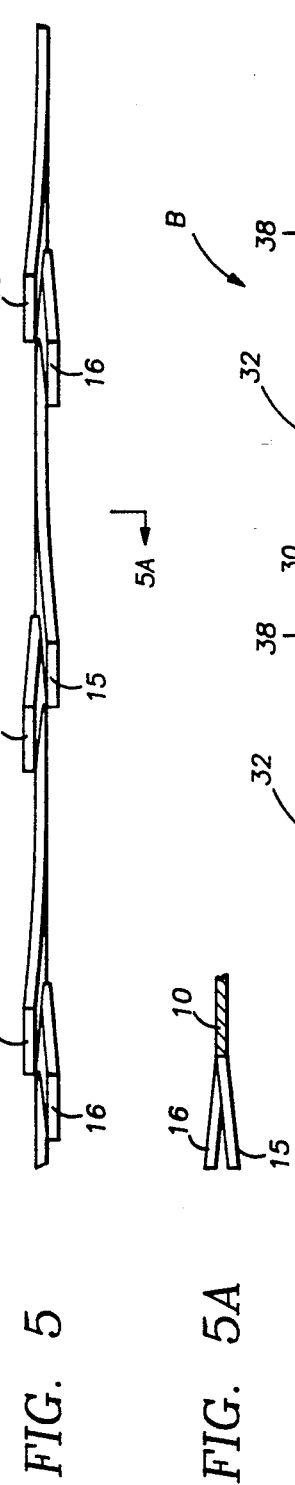
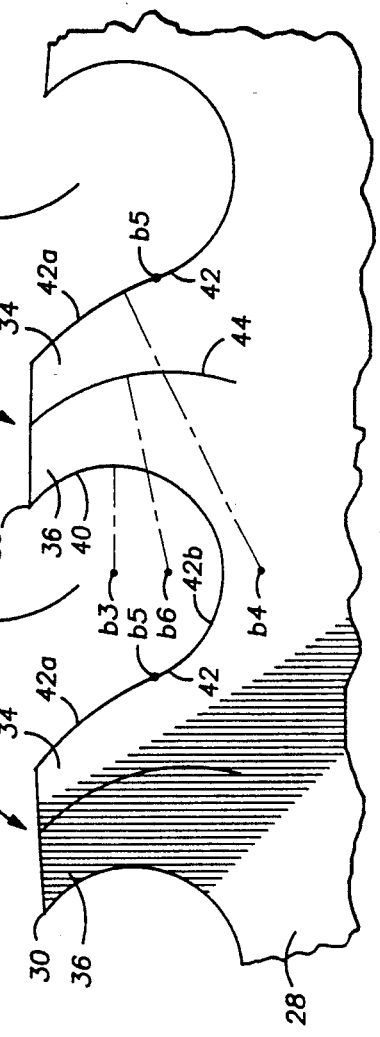
FIG. 4
FIG. 4A
FIG. 5
FIG. 5A
FIG. 9

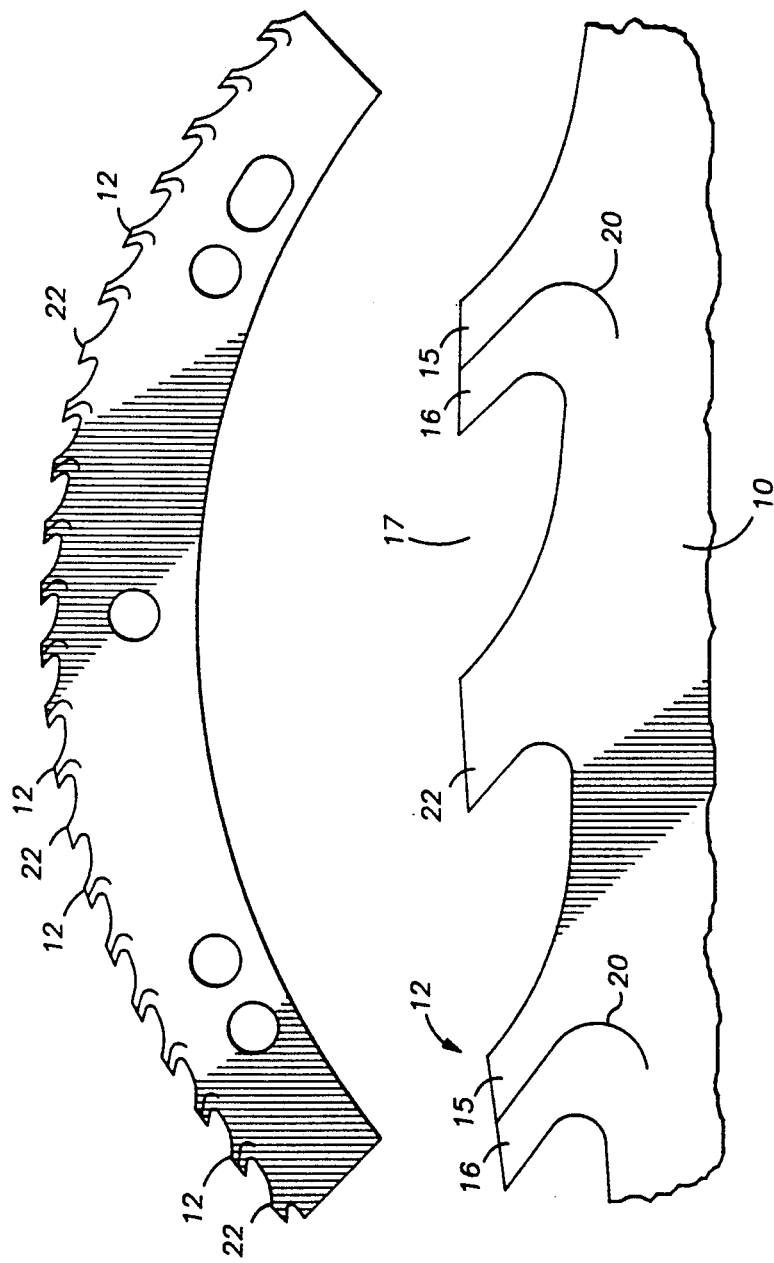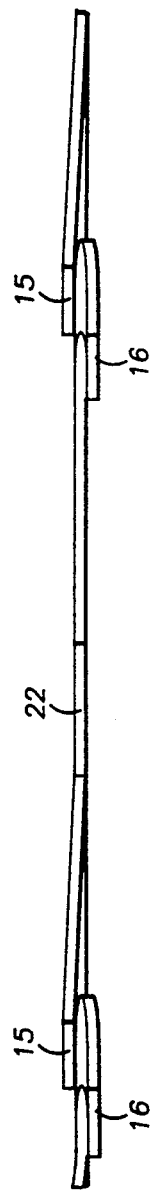
FIG. 6
FIG. 7
FIG. 8

TIRE RASP BLADE

This is a continuation of co-pending application Ser. No. 07/682,563 filed on Apr. 9, 1991, abandoned.

BACKGROUND OF THE INVENTION

1. Field of the Invention

This invention relates to rasp blades used for removing rubber from the carcass of a tire in order to prepare the carcass for retreading.

2. Description of the Prior Art

Prior to applying a new tread to a tire carcass, it is necessary to prepare the surface of the carcass so that it is substantially uniform and has the proper shape and condition for receiving the tire retread material. It has been customary for a number of years to use a rotating hub with a large number of rasp blades mounted on the hub for cutting and buffing the surface of the tire carcass to prepare such surface for receiving the retread material. Such rasp blades have been used in numerous configurations and shapes in the prior art.

The preferred rasp blades in use prior to the 1960's had negative rake teeth of generally triangular profile notwithstanding short-comings in life and performance, since positive rake had been found to cause dragging and tearing which was cumulative and uncontrollable. This apparently occurred since the tooth spacing and tooth tip angles employed in rasp blades with positive rake teeth had a stretching effect which, under moderate to heavy pressure, pulled the rubber into the path of oncoming teeth.

The break-through which enabled positive rake to be used came with blades having tooth sets oppositely directed wherein teeth with negative rake were interposed between those with positive rake. Examples of such prior art tire rasps are disclosed in U.S. Pat. Nos. 2,896,309, 3,082,506 and 3,680,185. The control resulting from these configurations enabled the rasps to perform effectively, with higher rate of tread removal and longer life.

The control provided by teeth oppositely inclined, as described above, stems from the proximity of the outer edge of the negative rake teeth to the leading edge of the positive rake teeth. The teeth are usually in the form of sets of four with two pairs of teeth facing at opposite angles of inclination to each other with recesses between the teeth. Other examples of such prior art tire rasps are disclosed in U.S. Pat. No. 4,747,194, and the prior art cited therein. The present invention is an improvement on the tire rasp blades disclosed in the above patent and departs from the concept of oppositely inclined teeth which has been the common trade approach to rasp blade construction.

SUMMARY OF THE INVENTION

The present invention is an improved tire rasp blade which is used for forming a substantially uniform surface on a tire carcass, and for the purpose of preparing that surface for receiving retread material which is bonded or otherwise attached to the tire carcass. The tire rasp blade of the present invention is preferably made with an arcuate shape and a plurality of sets of teeth at the outer working edge having recesses between each set of teeth. Each set of teeth is inclined in the same direction and is formed by two teeth, with the pair of teeth in each set separated by an inclined narrow slit which has a curved portion at its inner end and which extends inwardly beyond the depth of the recesses between the teeth, to thereby facilitate setting of the teeth and to provide the blade with maximum strength in all of the teeth and with a minimum of breakage of the teeth during usage. Each pair of teeth in each set may then be displaced laterally or angularly from each other and from the body of the rasp blade. Each tooth of each pair includes a leading edge and a trailing edge wherein the portion of the teeth edges near the outer working edge of the blade may be substantially straight or curved.

In another embodiment of the invention, clearing teeth are provided wherein each clearing tooth replaces a pair or set of teeth at intervals along the rasp blade of the first embodiment described above. Each clearing tooth is formed by a single tooth without the inclined narrow slit and without displacement from the body of the rasp blade creating a single clearing tooth. The clearing teeth dislodge embedded metal, stones, steel insertion and the like to thereby limit damage to and breakage of the other, more numerous pairs of slit teeth.

Contrary to the teachings of the prior art such as U.S. Pat. No. 4,747,194, wherein oppositely inclined adjacent pairs of teeth are used, it has been found that successful results are obtainable with unidirectional teeth by having increased circumferential width of the outer edge of the teeth, and by using a suitable width of recess between the trailing tip of each tooth and the leading tip of the following tooth, paying due regard to tip angle. An important property credited to the blades of prior art with oppositely inclined teeth was their "buffing" action which produced a surface described as having a good "texture" for attachment of the new tread. Trials of the blade of the present invention show that the tooth forms and proportioning of the blades also provide such advantages, producing a uniform, moderately abraded surface without dragging or tearing.

Additional advantages of the blades of the present invention include: 1) the elimination of unproductive wear on negative rake teeth, 2) a greater number of working teeth, and 3) greater tooth strength due to increased tooth width.

BRIEF DESCRIPTION OF THE DRAWINGS

The above and other embodiments of the present invention may be more fully understood from the following detailed description of an illustrative embodiment when taken together with an accompanying drawing wherein similar reference characters refer to similar elements throughout and in which:

FIG. 4 is a plan view of the rasp blade portion of FIG. 2 showing another form of the set or lateral displacement of the teeth of the blade;

FIG. 4A is an end view looking along lines 4A—4A of FIG. 4.

FIG. 5 is a plan view of the rasp blade portion of FIG. 2 showing another arrangement in which the teeth of the blade of FIG. 1 are alternatively displaced on opposite sides of the blade body;

FIG. 5A is an end view looking along lines 5A—5A of FIG. 5;

FIG. 6 is an elevation of an alternative embodiment of the tire rasp blade of the present invention which has clearing teeth at designated intervals;

FIG. 7 is an enlargement of a portion of the rasp blade illustrated in FIG. 6;

FIG. 8 is a plan view of the rasp blade portion of FIG. 7 showing the preferred form of the set or lateral displacement of the teeth of the blade; and FIG. 9 is an enlargement of a portion of a modified rasp blade generally corresponding to the rasp blade of FIGS. 1 and 2 but having teeth of curved profile.

DESCRIPTION OF THE PREFERRED EMBODIMENTS

Figure 1:
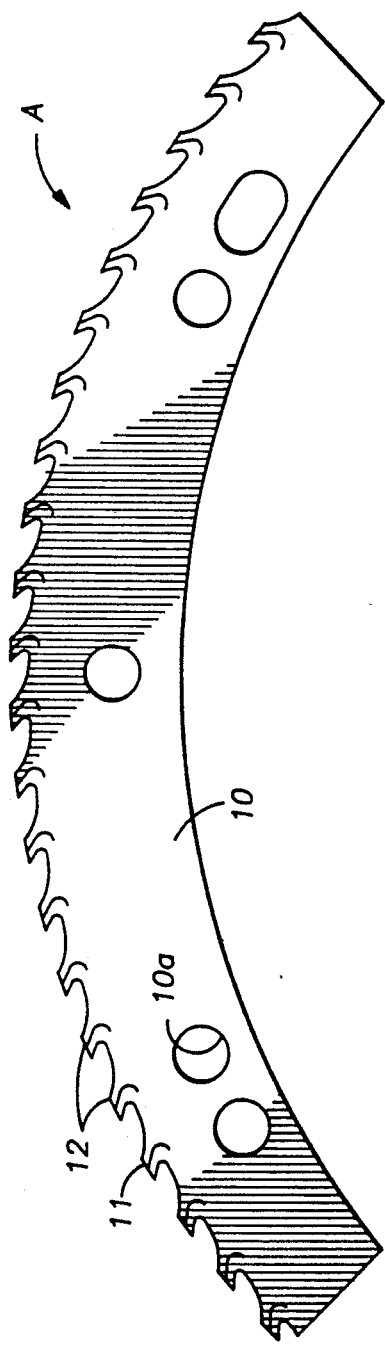
FIG. 1 is an elevation of a tire rasp blade in the preferred form of the present invention, but showing the teeth all in the same plane prior to placing the lateral set of the teeth as shown in FIGS. 3, 4 or 5.
Figure 2:
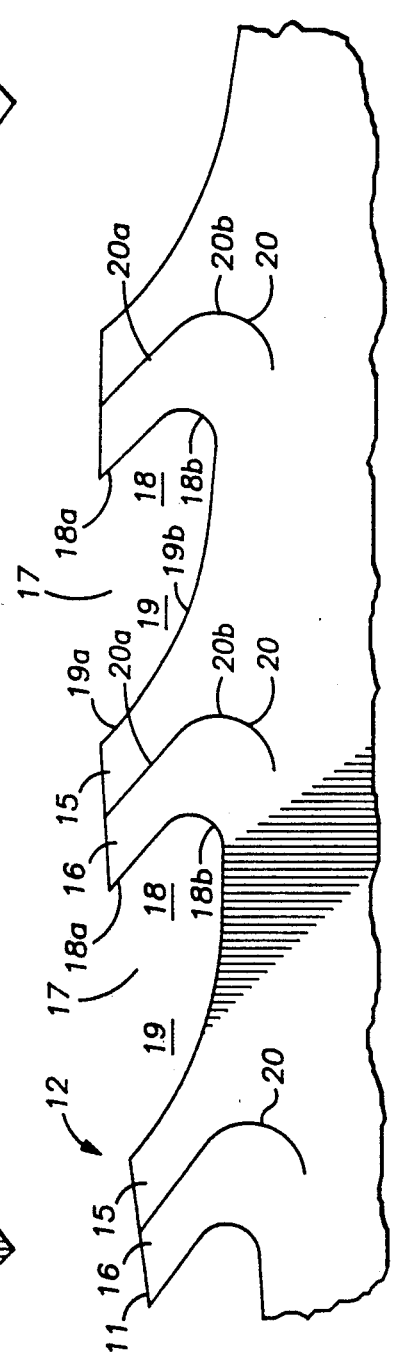
FIG. 2 is an enlargement of a portion of the rasp blade illustrated in FIG. 1.

Referring now to FIG. 1, a rasp blade generally referred to by the letter A, includes an arcuate blade body 10 which is generally of a length so that four to six of such blades form a complete circle for attachment to a circular hub, as is well known in the art, which is used for rotating the blades relative to the tire to be cut or buffed. The blade body 10 is provided with spaced holes 10a through which pass pins (not shown) carried in the hub and serving to attach the blade A to the hub, as is well known. The blade A has an outer edge 11 which is a segment of a circle and which is formed with a plurality of teeth sets 12. The teeth sets 12 are repetitive and in the present invention each set includes two teeth 15 and 16 (FIG. 2). The number of teeth sets 12 in each rasp blade A may vary, but in the usual case would number from about twenty to twenty five sets per blade.

Hitherto rasp blades have been made with oppositely angled pairs of teeth so it could be rotated in either direction on the hub and reversed after a period of use. The trade wisdom hitherto was that better performance and life could be extracted from such an arrangement. The present blade form however has been found to outperform blades with oppositely angled teeth sets.

FIG. 2 is an enlargement of a portion of the rasp blade A illustrated in FIG. 1. A recess 17 is formed at the outer edge 11 between the teeth sets 12. The recess 17 includes a substantially straight inclined upper edge 18a merging with a curved edge 18b which forms a leading side edge 18 of the teeth sets 12. The recess 17 also includes a substantially straight inclined upper edge 19a merging with an inclined curved edge 19b which forms the trailing side edge 19 of the teeth sets 12. In the preferred embodiment, the recess 17 has a width at the outer edge 11 which is within the range of about 0.18 to about 0.22 inch, the teeth 15 and 16 have a width at the outer edge 11 which is within the range of from about 0.040 to about 0.060 inch, and the recess 17 has a depth which is within the range of from about 0.090 to about 0.120 inch, these being indicative of suitable sizes, but without limitation thereto.

The teeth 15 and 16 in each teeth set 12 are formed by an inclined slit 20 lying mid-way between the leading and trailing side edges 18 and 19 of teeth sets 12 so as to form the teeth 15 and 16 of substantially the same width. The slit 20 is formed from a substantially straight upper slit 20a preferably extending from the outer edge 11, followed by a curved lower slit 20b inclining inwardly to a point in blade body 10 that is about 1.5 times the depth of recess 17, with continuing curvature as shown in FIG. 2. By forming the slit 20 as a narrow cut or slit in the metal of the blade body 10, rather than forming it as a cutout or slot with metal that is removed, the maximum amount of metal is left in the teeth 15 and 16 and therefore the maximum strength is obtained for the selected width of the two teeth 15 and 16 forming the teeth set 12. Also, over the outer working portion of each tooth length, the upper edge 18a of the leading side edge 18 is substantially straight and substantially parallel to the upper slit 20a as well as to the upper edge 19a of the trailing side edge 19. The slit 20 also forms a trailing side edge for the leading tooth 16, and a leading side edge for the trailing tooth 15 for each teeth set 12.

By reason of such configuration, both of the teeth 15 and 16 are of substantially equal strength and they bear substantially equal loads during use so that the distribution of the load forces is equalized and thus the breakage of the teeth 15 and 16 is minimized. By reason of each tooth having a width throughout its length which is at least as wide as at its outer edge, there are no reduced width portions in the teeth 15 and 16 thereby avoiding weaker areas that might result in breakage of the teeth 15 and 16. It has been found that the rasp blades according to the present invention have less tooth breakage over a longer period of satisfactory tire material removal and buffing action of tires than blades of the prior art.

Figure 3:
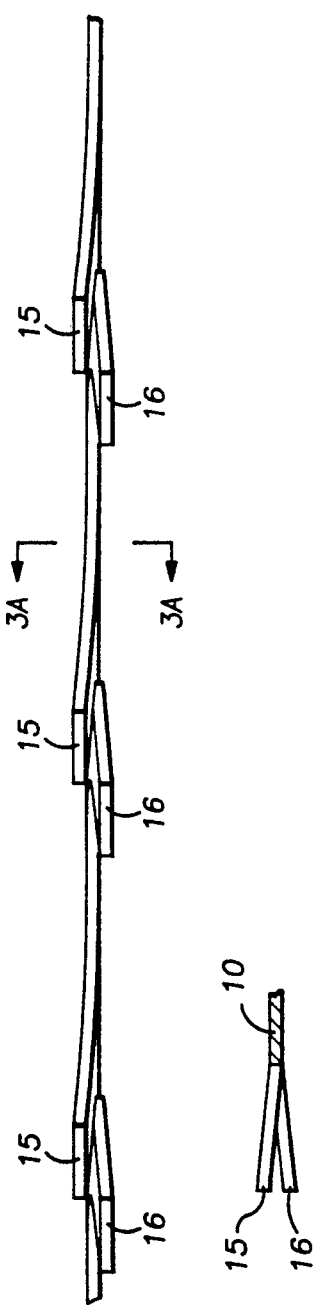
FIG. 3 is a plan view of the rasp blade portion of FIG. 2 showing one embodiment of the set or lateral displacement of the teeth of the blade shown in FIG. 1.
Figure 3A:
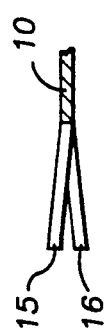
FIG. 3A is an end view looking along lines 3A—3A of FIG. 3, showing further details of the set or lateral displacement of the teeth shown in FIG. 3.

FIGS. 3 and 3A illustrate one embodiment of the set or lateral displacement wherein the teeth 15 and 16 are angled relative to the blade body 10.

FIGS. 4 and 4A illustrate another form of the set or lateral displacement wherein each of the teeth 15 and 16 are set laterally from the blade body 10 and parallel to each other and the blade body 10. As best shown in FIG. 4A, the manner of setting is indicated at points marked $b_1$ and $b_2$, $b_1$ showing the blade body 10 angled outwardly so as to displace the bottom of the recess 17 to the point $b_2$, the remaining outwardly disposed portion of the tooth 15 lying in a plane denoted as $p_1$, parallel to the blade body 10. Similarly, the tooth 16 is set into a plane denoted as $p_2$; also parallel to the blade body 10, and on the opposite side. In this manner, each of the teeth 15 and 16 are set to lie parallel to the blade body 10 and parallel to each other, which is believed to strengthen the teeth 15 and 16 and allow free cutting and cooler operation.

FIGS. 5 and 5A illustrate another alternative embodiment of the set or lateral displacement wherein every other one of the teeth 15 and every other one of the teeth 16 are displaced in the opposite direction from the blade body 10 as that shown in FIG. 3.

FIG. 6 illustrates an alternative embodiment of the blade forms of FIGS. 1-5 wherein the same elements are given identical reference numerals. In FIG. 6, clearing teeth 22 are provided at intervals between a plurality of teeth sets 12 along the rasp blade A. The clearing teeth 22 serve to dislodge embedded metal, stones, steel insertion and the like to thereby limit damage to and breakage of the more numerous slit teeth 15 and 16 and to prolong the working life of the rasp blade A.

FIG. 7 is an enlargement of a portion of the rasp blade A illustrated in FIG. 6 showing that the clearing teeth 22 are a similar shape and size of the teeth sets 12, although the clearing teeth 22 do not include the slit 20 which otherwise divides the teeth sets 12 into the teeth 15 and 16. In this manner, each clearing tooth 22 is generally a single tooth rather than a pair of teeth. As best shown in FIG. 7, each clearing tooth 22 is approximately the same size and shape as the teeth set 12 without the slit 20 which otherwise divides the teeth set 12 into the pair of teeth 15 and 16.

FIG. 8 is a plan view of the rasp blade A of FIG. 7 illustrating that the clearing teeth 22 are in the plane of the blade body 10 and not laterally or angularly set relative to the blade body 10 as is done with the teeth 15 and 16.

FIG. 9 shows a modified blade form referred to by the letter B, generally corresponding to the rasp blade A of FIGS. 1 and 2, except that the leading and trailing side edges of the teeth are curved rather than straight as in FIG. 2. The blade form B has an arcuate body 28 and an outer edge 30 which is similar to the outer edge 11 of FIG. 2. The outer edge 30 is formed with a plurality of repetitive teeth sets 32, wherein each of the teeth sets 32 includes two teeth 34 and 36. A recess 38 which is similar to, yet generally having greater depth than the recess 17 of FIG. 2, is formed of a leading side edge 40 and a trailing side edge 42. The depth of the recess 38 is preferably within the range 0.110 to 0.180 inch. The leading side edge 40 merges with lower portion 42b of the trailing side edge 42 which is defined by a circular arc with a radius point $b_3$, wherein the arc extends from outer edge 30 to a point $b_5$ located on the trailing side edge 42. The radius of this circular arc is preferably within the range 0.060 to 0.100 inch. An upper portion 42a of the trailing side edge 42 is defined by a circular arc with a radius point $b_4$ such that the upper and lower portions 42a and 42b of the trailing side edge 42 merge at the point $b_5$. The teeth 34 and 36 of each teeth set 32 are formed by an inclined slit 44 lying between the leading and trailing side edges 40 and 42 of the teeth sets 32. The slit 44 is defined by a circular arc with a radius point $b_6$ such that the slit 44 extends from the outer edge 30 to a point within the body 28 of blade B. The slit 44 also forms a trailing side edge for the leading tooth 36, and a leading side edge for the trailing tooth 34 for each teeth set 32.

The blade form B of FIG. 9 may also include clearing teeth (not shown), similar to the clearing teeth 22 as shown in FIGS. 6-8, wherein the teeth sets 32 do not include the slit 44 and wherein the clearing teeth are in the plane of the blade body 28 and not laterally displaced.

The rasp blade embodiments described above are generally of a length so that four to six of such blades form a complete circular blade for attachment to a circular hub (not shown). A plurality of these circular blades are spaced side by side on the hub, and the hub is mounted on an arbor or shaft of a driving motor (not shown). As is well known in the art, the driving motor rotates the hubs and the rasp blades attached thereto relative the surface of a tire carcass to cut and buff the surface of the tire carcass and to prepare it for receiving retread material.

The foregoing disclosure and description of the invention are illustrative and explanatory thereof, and various changes in the size, shape, and materials, as well as in the details of the illustrated construction may be made without departing from the spirit of the invention.

What is claimed is:

1. A tire rasp blade, comprising:
   a blade formed from a substantially planar body having an outer edge which is a segment of a circle;
   a plurality of teeth formed at said outer edge of said body in sets of two teeth, with a recess between each set, each of said teeth having a leading side edge, with the two teeth in each set being separated by a narrow slit such that adjacent side edges of said two teeth are not substantially spaced apart in the circumferential direction and a trailing side edge;
   said plurality of teeth being formed as a portion of said planar body to form a unitary blade body throughout said segment of the circle;
   the width of each of said sets of two teeth being in the range of about 0.08 inches to about 0.12 inches, and the width of said recess between each of said sets of two teeth being about 0.18 inches to about 0.22 inches;
   substantially all of said leading side edges and trailing side edges of said teeth on said body having an angle of inclination relative to said outer edge extending in substantially the same circumferential direction; and
   the outer portions of said planar body forming the teeth in each of said sets of two teeth being displaced laterally from each other and diverging from the plane of said planar body to the opposite sides of said blade body.

2. The tire rasp blade set forth in claim 1, wherein:
   said outer portions of the teeth being disposed substantially parallel to each other and to the blade body.

3. The tire rasp blade set forth in claim 1, wherein:
   said two teeth in each set are adjacent except for a slit forming the separation between them; and
   said salt extending generally mid-way between the sides of each of said two teeth in each set.

4. The tire rasp blade set forth in claim 3, wherein:
   said slit extends from said outer edge of said blade body inwardly therefrom to a point which is further inwardly than the depth of the recesses between said sets of two teeth, and the lateral displacement of the teeth commencing from said point.

5. The tire rasp blade set forth in claim 1, wherein:
   one of the teeth in each of said sets of two teeth is the leading tooth and the other is the trailing booth;
   said leading tooth including said leading edge wherein said leading edge includes a substantially straight portion at the outer extent of said leading tooth; and
   said trailing tooth including said trailing edge wherein said trailing edge includes a substantially straight portion at the outer extent of said trailing tooth.

6. The tire rasp blade set forth in claim 5, wherein:
   said leading tooth and trailing tooth in each set are adjacent except for a slit forming the separation between them; and
   said slit having a substantially straight portion extending generally mid-way between said leading tooth leading edge and said trailing tooth trailing edge.

7. The tire rasp blade set forth in claim 6, wherein:
   said leading tooth leading edge substantially straight portion, said trailing tooth trailing edge substantially straight portion, and said slit substantially straight portion are substantially parallel with each other.

8. The tire rasp blade set forth in claim 5, wherein:
   the widths of the leading tooth and the trailing tooth are substantially the same throughout their lengths.

9. The tire rasp blade set forth in claim 1, wherein:

one of the teeth in each of said sets of two teeth is the leading tooth and the other is the trailing tooth;

said leading tooth including said leading edge wherein said leading edge includes a substantially straight portion at the outer extent of said leading tooth followed by an inner curved portion;

said trailing tooth including said trailing edge wherein said trailing edge includes a substantially straight portion at the outer extent of said trailing tooth followed by an inner curved portion, said trailing tooth trailing edge inner curved portion merging with said leading tooth leading edge inner curved portion wherein said leading tooth leading edge and said trailing tooth trailing edge in adjacent sets of two teeth defining said recesses between said sets of two teeth;

said two teeth in each set being adjacent except for a slit forming the separation between them; and said slit having a substantially straight portion at the outer extent of said blade body, said slit extending generally mid-way between the sides of each of said two teeth in each set, and having a curved inner portion extending inwardly into said blade body generally towards the recess partially formed by said leading tooth leading edge, said slit terminating at a depth greater than the depth of said recess.

10. The tire rasp blade set forth in claim 9, wherein: said leading tooth leading edge substantially straight portion, said trailing tooth trailing edge substantially straight portion, and said slit substantially straight portion are substantially parallel with each other.

11. The tire rasp blade set forth in claim 9, wherein: the widths of the leading tooth and the trailing tooth are substantially the same throughout their lengths.

12. The tire rasp blade of claim 1, wherein all of teeth having said leading and trailing side edges are straight and parallel outwardly of the depth at which they merge with said recesses.

13. The tire rasp blade of claim 1, wherein:
said leading tooth and said trailing tooth are of substantially equal width at said outer edge and each tooth having a width throughout its length which is at least as wide as at its outer edge;
said planar body has an arcuate curvature; and
said outer edge of said tooth conforms to the arcuate curvature of said planar body.

14. A tire rasp blade, comprising:
a blade formed from a substantially planar body having an outer edge which is a segment of a circle;
a plurality of teeth formed at said outer edge of said body in sets of two teeth, with a recess between each set spacing apart adjacent sets, each of said teeth having a leading side edge, with the two teeth in each set being separated by a narrow slit such that adjacent side edges of said two teeth are not substantially spaced apart in the circumferential direction, said recesses between each of said sets of two teeth each having substantially the same width and depth; and a trailing side edge;
said plurality of teeth being formed as a portion of said planar body to form a unitary blade body throughout said segment of the circle;
substantially all of said leading side edges and trailing side edges of said teeth on said body having an angle of inclination relative to said outer edge extending in substantially the same circumferential direction; and the outer portions of said planar body forming the teeth in each of said sets of two teeth being displaced laterally from each other and diverging from the plane of said planar body to the opposite sides of said blade body.

15. The tire rasp blade set forth in claim 1, further comprising:
a plurality of clearing teeth formed at said outer edge wherein each said clearing tooth having an angle of inclination relative to said outer edge extending in substantially the same circumferential direction, lying in the same plane as that of said blade body; and
wherein a majority of said teeth formed at said outer edge being formed in said sets of two teeth and wherein said clearing teeth being located at intervals between a plurality of said sets of two teeth.

16. The tire rasp blade set forth in claim 6, further comprising:
a plurality of clearing teeth formed at said outer edge wherein each said clearing tooth having an angle of inclination relative to said outer edge extending in substantially the same circumferential direction, lying in the same plane as that of said blade body; and
wherein a majority of said teeth formed at said outer edge being formed in said sets of two teeth and wherein said clearing teeth being located at intervals between a plurality of said sets of two teeth.

17. The tire rasp blade set forth in claim 1, wherein:
one of the teeth in each of said sets of two teeth is the leading tooth and the other is the trailing tooth; and
said leading tooth and said trailing tooth each having a curved leading edge and a curved trailing edge, with the curved leading edge of said leading tooth and the curved trailing edge of said trailing tooth in adjacent sets of two teeth defining said recesses between said sets of two teeth.

18. The tire rasp blade set forth in claim 14, wherein:
said leading tooth curved leading edge being defined by a first arcuate segment of a first circle having a center which leads said leading edge and intersects said blade body outer edge at an acute angle; and
said trailing tooth curved trailing edge having a curved upper portion at the outer extent of said trailing tooth being defined by an arcuate segment of a second circle having a center which leads said trailing edge and intersects said blade body outer edge at an acute angle, said trailing edge further having a curved lower portion at the inner extent of said trailing tooth being defined by a second adjacent arcuate segment of said first circle whereby said first and second arcuate segments of said first circle merge, and said second arcuate segment of said first circle merges with said arcuate segment of said second circle.

19. The tire rasp blade set forth in claim 14, wherein:
said two teeth in each set being adjacent except for a slit forming the separation between them; and
said slit extending generally mid-way between the sides of each of said two teeth in each set.

20. The tire rasp blade set forth in claim 16, wherein:
said slit is defined by a first arcuate segment of a circle having a center which leads and slit and intersects said blade body outer edge at an acute angle, and extends from said blade body outer edge inwardly therefrom to a point which is further inwardly than the depth of the recesses between said sets of two teeth.

21. The tire rasp blade set forth in claim 14, further comprising:
   a plurality of clearing teeth formed at said outer edge wherein each said clearing tooth having an angle of inclination relative to said outer edge extending in substantially the same circumferential direction, lying in the same plane as that of said blade body; and
   wherein a majority of said teeth formed at said outer edge being formed in said sets of two teeth and wherein said clearing teeth being located at intervals between a plurality of said sets of two teeth.

* * * * *